J. G. ZIMMERMAN.
ELECTRICAL MEASURING INSTRUMENT.
APPLICATION FILED FEB. 23, 1911.
1,178,772.
Patented Apr. 11, 1916.
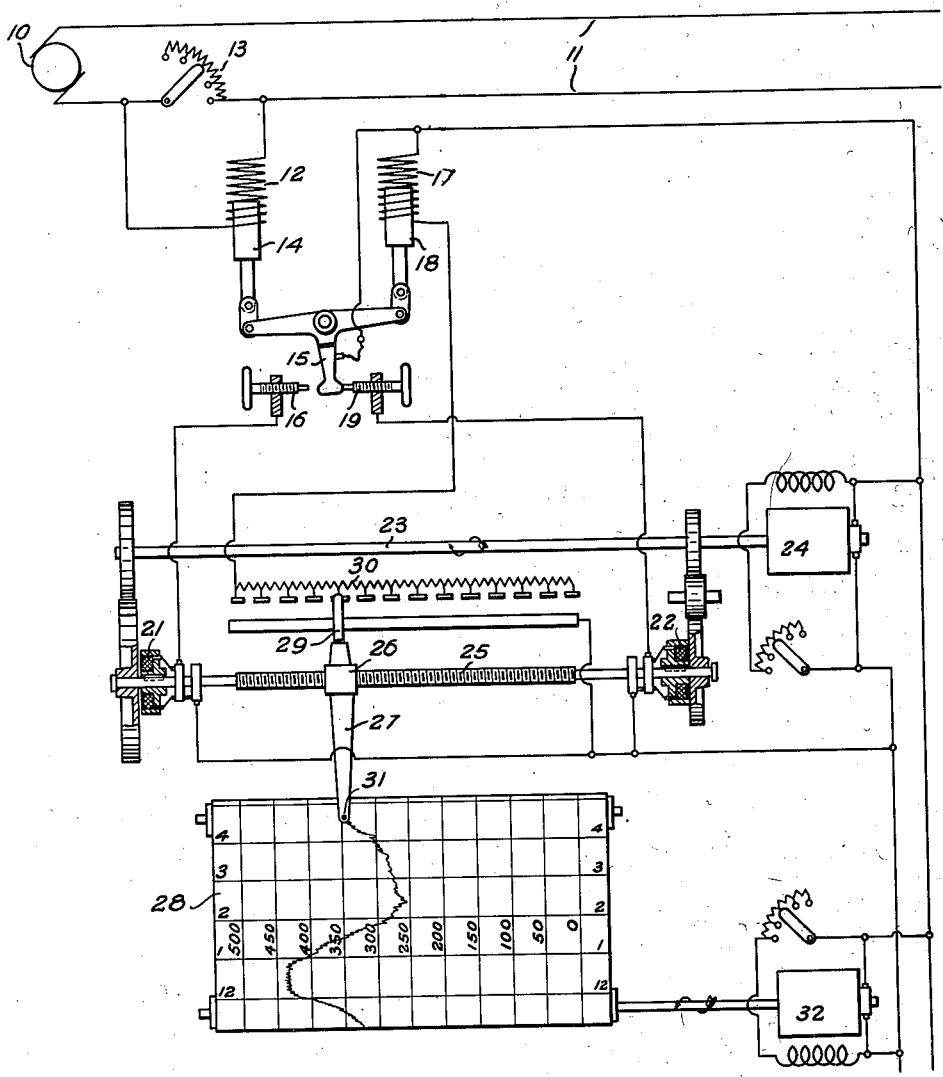

UNITED STATES PATENT OFFICE.

JAMES G. ZIMMERMAN, OF MILWAUKEE, WISCONSIN, ASSIGNOR, BY MESNE ASSIGN-MENTS, TO ALLIS-CHALMERS MANUFACTURING COMPANY, A CORPORATION OF DELAWARE.

ELECTRICAL MEASURING INSTRUMENT.

1,178,772.  Specification of Letters Patent.  Patented Apr. 11, 1916.

Application filed February 23, 1911. Serial No. 610,395.

*To all whom it may concern:*

Be it known that I, JAMES G. ZIMMERMAN, a citizen of the United States, residing at Milwaukee, in the county of Milwaukee and State of Wisconsin, have invented certain new and useful Improvements in Electrical Measuring Instruments, of which the following is a full, clear, and exact specification.

My invention relates to electrical measuring instruments.

In most electrical measuring instruments there is a pointer movable over a scale in accordance with variations in the electrical quantity to be measured.

It is the object of my invention to improve the accuracy and reliability of such structures. In attaining this object a coil responsive to the electrical quantity to be measured, such as current or voltage, controls, directly or indirectly, the movement of a pointer over a scale, and is opposed by a force which is varied in accordance with the position of the pointer on the scale. The pointer may coöperate with either a stationary or a movable scale, and may or may not make a record on the scale. The opposing force is preferably provided by a second coil, the ampere turns of which are controlled by the position of the pointer. In order to make the parts directly moved by the coil as sensitive as possible, such parts preferably comprise merely a light double-throw circuit-closing mechanism, which in its respective positions causes some suitable source of power to operate the pointer in opposite directions. In order to minimize the power required to reverse the pointer, the source of power is preferably a constantly moving one, such as a shaft driven by a constantly running electric motor, and is connected to the pointer to move it in opposite directions by means of two clutch coils which are energized when the double-throw circuit-closing mechanism is in its two positions respectively.

The various novel features of my invention will appear from the description and drawings, and will be particularly pointed out in the claims.

The single figure of the drawing shows diagrammatically a recording ammeter embodying my invention.

A generator 10, which is shown as a direct current generator by way of illustration, supplies the mains 11 of any suitable circuit. A coil 12 is connected to be responsive to the current supplied by the generator 10, this coil being shown as connected in shunt to a series rheostat 13 by which the proportionate part of the main current taken by the coil may be adjusted. This coil 12 is the coil which is responsive to the electrical quantity to be measured. Though in the arrangement illustrated this electrical quantity is the current supplied by the generator 10, it may be any other electrical quantity variations in which will cause variations in the strength of the pull exerted by a coil; indeed, the electrical quantity may be merely proportional to some other variable quantity which it is desired to measure by measuring such electrical quantity. The core 14 of the coil 12 is mechanically connected to a switch arm 15, which it tends to move into engagement with a contact 16. It is opposed in this by a coil 17, the core 18 of which is also mechanically connected to the arm 15, and which tends to move said arm into engagement with the contact 19. The coil 17 is supplied from any suitable constant potential circuit. The contacts 16 and 19, which are preferably adjustable, are connected to two clutch coils 21 and 22 respectively. These clutch coils, when energized, respectively connect a shaft 23, constantly driven by a motor 24, to drive a threaded shaft 25 in opposite directions. On the threaded shaft 25 is a nut 26 carrying a pointer 27 movable over a scale 28 and a bar 29 movable to vary the amount of the resistance 30 in circuit with the coil 17. The scale 28 is shown as a recording scale on which a record is made by a pen 31 carried by the pointer 27. This scale is driven in any suitable fashion, as by a constantly running electric motor 32. The clutch coils 21 and 22 and the motors 24 and 32 are preferably supplied from the same constant potential circuit which supplies the coil 17.

If the current supplied by the generator 10 remains constant, the arm 15 remains in its middle position, out of engagement with both contacts 16 and 19. When the current supplied by the generator 10 rises, the pull of the coil 12 is increased and the arm 15 is moved into engagement with the contact 16. This energizes the clutch coil 21, and causes the shaft 23 to drive the threaded shaft 25 in the proper direction to move the nut 26 and pointer 27 to the left. This movement not only brings the pointer to a higher reading on the scale 28, but also moves the arm 29 to diminish the amount of the resistance 30 in circuit with the coil 17, thereby causing an increase in the pull of such coil in opposition to the coil 12. The movement of the nut 26 and pointer 27 will continue until the pull of the coil 17 equals that of the coil 12, whereupon the arm 15 will be moved out of engagement with the contact 16 and the clutch 21 will be deënergized. This equality between the pull of the coils 12 and 17 may be obtained either because the current supplied by the generator 10 diminishes or because the current in the circuit of the coil 17 is increased.

If the arm 15 is in its middle position, the pointer 27 being in any position, and the current supplied by the generator 10 decreases, the pull of the coil 17 exceeds that of the coil 12 and the arm 15 is moved into engagement with the contact 19. This energizes the clutch coil 22 and causes the shaft 23 to drive the shaft 25 in the reverse direction from that previously described or in the proper direction to cause a movement of the nut 26 and pointer 27 to the right. This diminishes the reading on the scale 28, and also increases the amount of the resistance 30 in the circuit of the coil 17. The movement continues until the pull of the coil 17 has been decreased into equality with that of the coil 12, whereupon the arm 15 resumes its middle position, the clutch coil 22 is deënergized, and the shaft 25, nut 26, and pointer 27 are stopped.

The speeds at which the pointer 27 is driven in the two directions are preferably equal, though this is not necessary. In any case the movement of the pointer 27 continues, in either direction, while the arm 15 is in engagement with either of the contacts 16 or 19, and ceases as soon as it breaks engagement therewith. The engagement between the arm 15 and one of the contacts 16 and 19 will take place whenever there is any inequality between the pulls of the coils 12 and 17, and will continue while such inequality continues. The resultant movement of the pointer 27 is always such as to vary the strength of the current taken by the coil 17 to bring the pull of such coil into equality with that of the coil 12.

Many modifications in the precise arrangement shown and described may be made without departing from the spirit and scope of my invention and all such I aim to cover in the following claims.

What I claim as new is:

1. In an electrical measuring device, the combination of a coil carrying current variable in response to variations in the electrical quantity to be measured, a second coil opposing said first coil and carrying current whose variations are dissimilar to the variations of the current in said first coil, an indicating device, and mechanism for operating said indicating device comprising a circuit-closing member occupying a neutral position when the electrical quantity to be measured remains constant at any value and operative to one or another circuit-closed position in response to variations in the energization of said coils.

2. In an electrical measuring instrument, the combination of a coil responsive to changes in the electrical quantity to be measured, a second coil the pull of which opposes that of the first coil, an indicating pointer movable in one direction or the other according as the pull of the one coil exceeds that of the other, means for accomplishing the actuation of said pointer comprising a circuit-closer responsive to said coils and occupying a circuit-open position while the electrical quantity to be measured remains constant at any value, and means controlled by such movement of said pointer for varying the pull of one coil toward equality with that of the other coil.

3. In an electrical measuring instrument, the combination of a coil responsive to the electrical quantity to be measured, a second coil the pull of which opposes that of the first, double-throw contact-making mechanism controlled by the resultant pull of said two coils and capable of occupying a neutral position for all values of said electrical quantity to be measured, a pointer movable over a scale, a power-operated device which moves the pointer in one direction or the other relatively to the scale according as said contact-making mechanism is in one position or the other, and a resistance which is in series with the second coil and is varied by such movement of the pointer.

4. In an electrical measuring instrument, the combination of a coil responsive to the electrical quantity to be measured, a second coil the pull of which opposes that of the first, double-throw contact-making mechanism controlled by the resultant pull of said two coils and occupying a neutral position while said electrical quantity remains constant at any value, a pointer movable over a scale, a power-operated device which moves the pointer in one direction or the other relatively to the scale according as said contact-making mechanism is in one position or the other, and a variable resistance which is in circuit with said second coil and is decreased by movements of the pointer resultant upon a predominance of the pull of the first coil over that of the second and is increased by movements of the pointer resultant upon a predominance of the pull of the second coil over that of the first.

5. In an electrical measuring device, the combination of two opposing coils one of which is responsive to variations in the electrical quantity to be measured, a double-throw circuit-closer actuatable from neutral position in response to an unbalanced effect of said opposing coils, an indicator, means controlled by said circuit-closer when actuated to either of its operative positions for effecting the operation of said indicator, said circuit-closer occupying a neutral position while said quantity to be measured remains constant for an appreciable time at any of its normally attainable values, and means rendered operative through said circuit closer when in either of its operative positions and exercising a controlling effect on the second coil for effecting the return of said circuit-closer to neutral position.

6. In an electrical measuring device, the combination of an electromagnetic device a movable part of which is operative in response to variations in the electrical quantity to be measured, a movable indicator, and mechanism for causing operation of said indicator, said mechanism comprising a circuit-closer occupying a neutral position when the electrical quantity to be measured remains constant at any value and actuatable by said electromagnetic device to one or another operative position in response to a variation in the quantity to be measured, and means rendered operative through actuation of said circuit-closer and exercising its effect through said electromagnetic device to cause the return of said circuit-closer to neutral position when said quantity to be measured remains constant for an appreciable time at any of its values.

Milwaukee, Wis., Feb. 17, 1911.

In testimony whereof I affix my signature, in the presence of two witnesses.

JAMES G. ZIMMERMAN.

Witnesses:
  CHAS. L. BYRON,
  G. B. SCHLEY.